United States Patent [19]
Baker
[11] 4,302,806
[45] Nov. 24, 1981

[54] FILTER FOR POLYPHASE RECTIFIER

[75] Inventor: Richard H. Baker, Bedford, Mass.
[73] Assignee: Exxon Research & Engineering Co., Florham Park, N.J.

[21] Appl. No.: 111,291
[22] Filed: Jan. 11, 1980
[51] Int. Cl.³ .............................................. H02M 7/06
[52] U.S. Cl. ...................................... 363/126; 363/45
[58] Field of Search ........................ 363/34, 37, 44–46, 363/126, 52–53; 333/172, 181; 307/105

[56] References Cited
U.S. PATENT DOCUMENTS

| | | | |
|---|---|---|---|
| 3,317,819 | 5/1967 | Brodie | 333/181 X |
| 3,508,135 | 4/1970 | Dijkstra et al. | 363/129 |
| 3,986,100 | 10/1976 | Beierholm et al. | 363/37 X |
| 4,191,986 | 3/1980 | Huang et al. | 361/58 |

*Primary Examiner*—William M. Shoop
*Assistant Examiner*—Peter S. Wong
*Attorney, Agent, or Firm*—Kenneth Watov

[57] ABSTRACT

A filter for a polyphase rectifier includes first and second substantially identical sections each including a capacitor connected in series with a parallel circuit of a diode and a resistor, the capacitors of each section being connected at one end in common to a neutral or reference voltage terminal of the rectifier, the other ends of the first and second sections being connected to positive and negative output terminals, respectively, of the rectifier, the diode of the first section being polarized for passing current from the positive output terminal to its respective capacitor, the diode of the second section being polarized for passing current from the neutral terminal to its respective capacitor, the values of the resistors and capacitors being chosen for preventing the flow of ripple current through the first and second sections and substantially preventing discharging of said capacitors, for ensuring that the rectifier supply most of the load current, and for substantially eliminating peak current demands upon said rectifier for recharging the capacitors, the diodes and resistors permitting reactive load current to flow bidirectionally through their respective capacitors, and the capacitors also providing high-frequency filtering.

22 Claims, 6 Drawing Figures

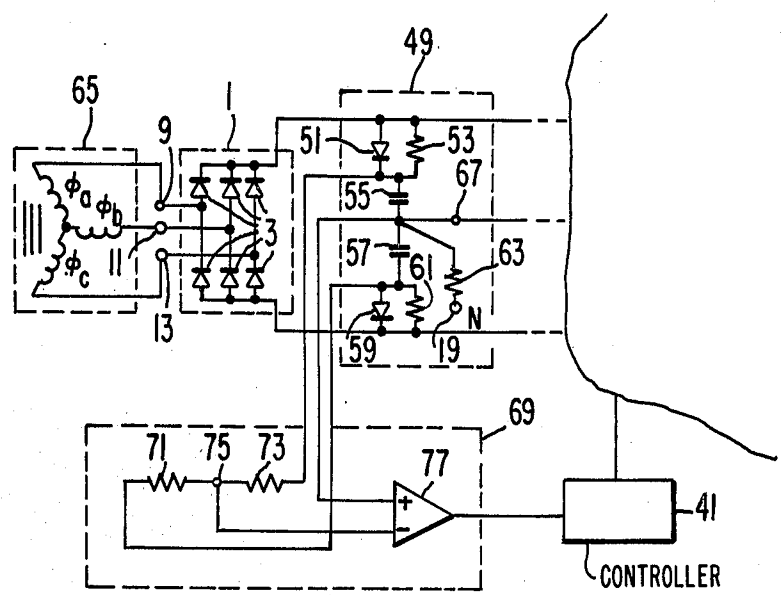
Fig. 4.
Fig. 5.
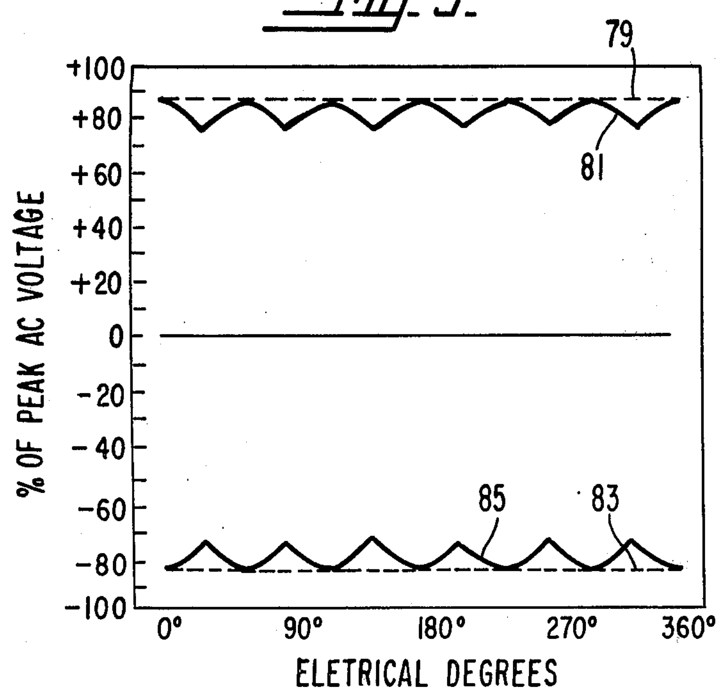

FILTER FOR POLYPHASE RECTIFIER

BACKGROUND OF THE INVENTION

The field of the present invention relates to filters for polyphase rectifiers, and, more particularly, to a filter for permitting the reactive load currents to flow between the output terminals of the rectifier and a reference voltage or neutral terminal of the rectifier.

Polyphase rectifier systems, such as a three-phase diode-bridge rectifier, for example, are required in certain applications to provide dc power to a reactive load, while permitting reactive load current to flow between the output terminals of the rectifier and a reference voltage or neutral terminal of the rectifier. It is known to connect only capacitors between the output terminals and the reference voltage terminal of the rectifier for providing the current conduction paths for the reactive load currents. There are a number of problems associated with the use of such filter capacitors, including the requirement that the capacitors be high-power types, in that they must supply power to the load for a predominant portion of the period of the ac voltage source supplying power to the rectifier, whereby the capacitors are costly and physically large in size. In addition, the capacitors are supplied current for recharging only at times that the amplitude of the polyphase supply voltage to the rectifier exceeds by one diode drop the level of voltage across the capacitors, which usually occurs near the peak of the waveforms of the polyphase supply voltage, creating substantially high-magnitudes of peak current demand from the rectifier during the times of recharging the capacitor. Accordingly, the rectifier must be designed to supply the relatively high-magnitude of recharge current during the short intervals of recharging the capacitors over the period of the polyphase input voltage. Also, during a substantially predominant portion of the period of the polyphase supply voltages, the capacitors supply power to the load, not the rectifier. As a result, the polyphase voltage source or supply is poorly utilized.

The present inventor recognized that in many applications, polyphase rectifiers do not require filter capacitors for providing smoothing of the ac ripple superimposed upon the dc output voltages of the rectifier, in that polyphase rectifiers have an inherently low ripple content in their output voltage. He discovered that the problems in the prior art could be overcome by including the parallel combination of a diode and resistor between the output terminals of the rectifier and their respective filter capacitors, with the diodes being polarized for permitting charging of their respective capacitors to the level and polarity of the voltage available at their respective output terminals. The value of the resistors are made large enough for substantially preventing the discharging of the capacitors over each cycle of the polyphase ac supply voltage, thereby blocking the flow of ripple current through the capacitors, and ensuring that the rectifier supplies substantially all of the power requirements of the reactive load over each cycle of the polyphase supply voltage, while permitting reactive load currents to flow bidirectionally between the output and reference terminals of the rectifier via the current conduction paths provided by the diodes, resistors, and capacitors.

In the drawing, wherein like components are indicated by the same reference number or designation:

FIG. 4 shows a circuit schematic diagram of a second embodiment of the invention;

FIG. 5 is a waveform diagram showing the relationship of the ripple voltage of the dc output voltages of the rectifier to the level of voltage across the filter capacitors, for either the first or second embodiments of the invention;

and

Figure 6:
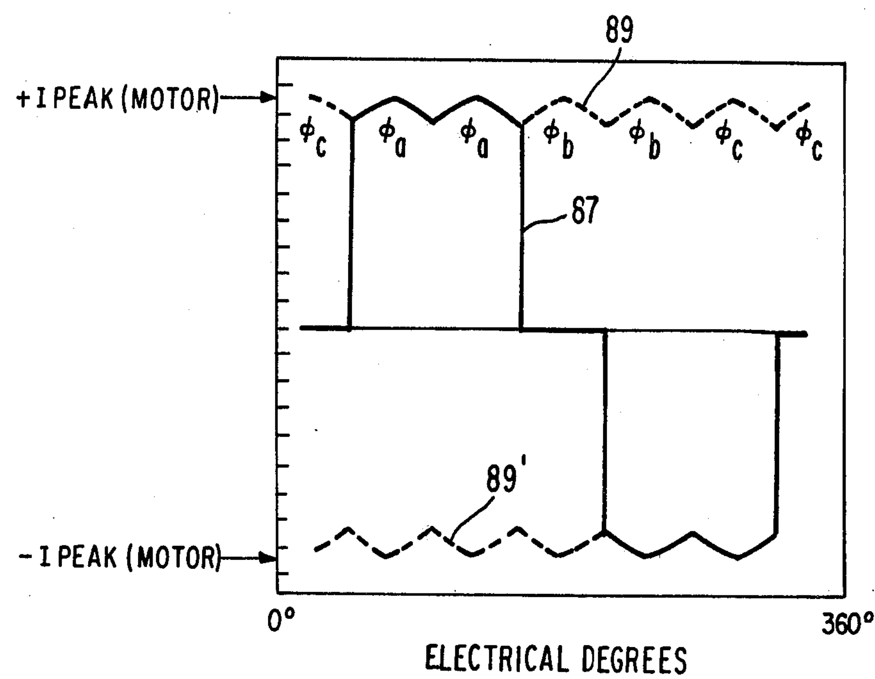

FIG. 6 is a waveform diagram showing the waveform of the current supplied by the rectifier to the reactive load in relation to one phase of the polyphase voltage supply, for either embodiment of the invention.

Figure 1:
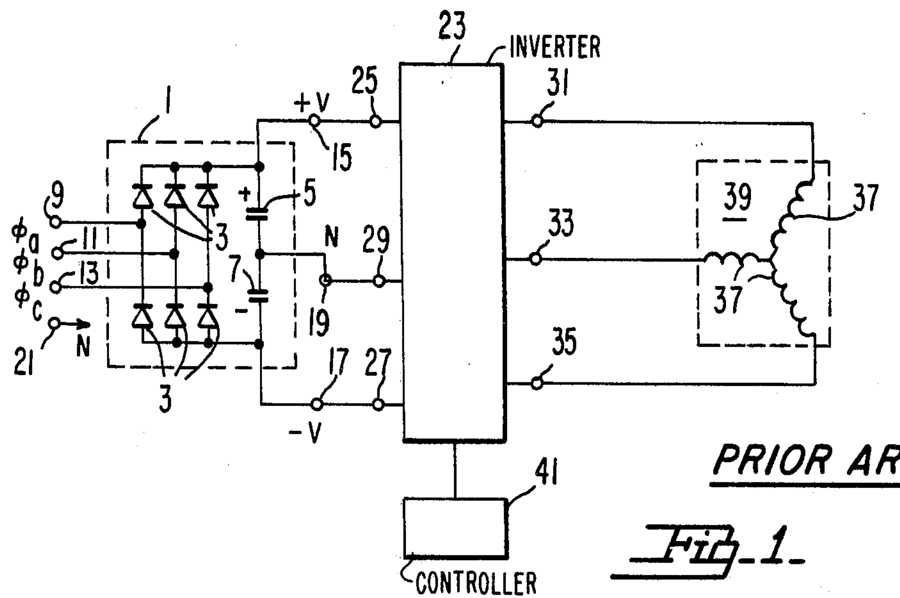
FIG. 1 is a schematic diagram of a prior art filter for a polyphase rectifier supplying power to a reactive load.

In FIG. 1, a prior art polyphase rectifier 1, (in this example, a three-phase polyphase rectifier is shown) includes six diodes, 3 arranged into a full-wave bridge circuit, a pair of filter capacitors 5,7, operating voltage terminals 9, 11, and 13, for receiving the polyphase voltages $\phi_a$, $\phi_b$, $\phi_c$, respectively, from a polyphase voltage supply, an output terminal 15 for providing a positive dc voltage +V, an output terminal 17 for providing a negative output voltage −V, and a reference or neutral terminal 19 for connection to a point of reference potential. An additional input terminal 21 is provided for receiving the neutral if a four wire polyphase voltage supply system is used, the terminal 21 being connected to reference voltage terminal 19. A reactive load connected to the rectifier 1 includes, in this example, an inverter 23 having operating voltage terminals 25 and 27 connected to terminals 15 and 17, respectively, of the rectifier, a common terminal 29 connected to the neutral or reference terminal 19 of the rectifier, and three-phase output terminals 31, 33, and 35 connected to the windings 37 of a three-phase motor 39. A controller 41, which can be a microprocessor, for example, is included for controlling the operation of the inverter 23. The inverter 23 is operable for conducting reactive currents from the motor 39 to the output terminals 15 and 17, and the reference terminal 19, of the rectifier 1.

Figure 2:
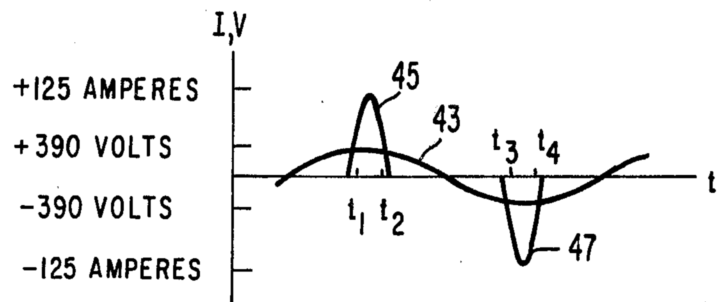
FIG. 2 is a waveform diagram showing the relationship between one phase of the polyphase supply voltage and the current for recharging the filter capacitors of the circuit of FIG. 1.

In the operation of the rectifier 1, in supplying power to the reactive load including inverter 23 driving ac motor 39, capacitor 5 when fully charged has a voltage thereacross of +V volts, and capacitor 7 when fully charged has a voltage thereacross of −V volts, with reference to terminal 19, which is connected to a source of reference potential such as the neutral line from the connection to terminal 21 of the neutral of the four-wire polyphase service (not shown) supplying the polyphase voltages to the rectifier 1. The capacitors 5 and 7 serve a multiple function, in this example, in that they supply power to the inverter 23 during a major or predominant portion of the period of any one of the polyphase operating voltages represented by phase a($\phi_a$), phase b($\phi_b$), and phase c($\phi_c$). For example, with reference to FIG. 2, assume that the voltage waveform 43 is the $\phi_a$ operating voltage connected to terminal 9, and as is typically the case, the waveform is a sinewave. In addition, for furthur purposes of illustration, assume that the motor 39 is a 25 horsepower, three-phase motor, and that the polyphase voltage supply is providing for each voltage phase, a peak amplitude of about 390 volts. The capacitors 5 and 7 are about 16,000 microfareds, with a voltage rating of 450 volts, and current rating of 100 amperes, for example. Laboratory tests were made with the motor being operated at 29 horsepower and drawing about 23 amperes (rms) of current in each one of its windings 37. At time $t_1$, the amplitude of the $\phi_a$ voltage is approaching its positive peak amplitude. When the amplitude of $\phi_a$ exceeds the voltage across capacitor 5 by at least one diode drop, the upper diode 3 associated with terminal 9 becomes forward biased, in turn, causing recharge current to now be supplied to capacitor 5 from the polyphase voltage source via the rectifier 1, which also supplies current to the inverter 23 instead of capacitor 5, between times $t_1$ and $t_2$. In this manner, capacitor 5 is recharged during the period of time between time $t_1$ and time $t_2$, the recharge current typically having a peak amplitude of 125 amperes, for the given conditions. After time $t_2$, the amplitude of the $\phi_a$ voltage decreases to below the voltage across capacitor 5, causing the associated diode 3 to become back biased, causing capacitor 5 to now supply current to the inverter 23 and begin discharging, until the $\phi_b$ voltage amplitude next exceeds the level of voltage across capacitor 5 for again recharging the capacitor 5 in the manner just described for $\phi_a$, followed by another period of time where capacitor 5 delivers power to the load until such time that the amplitude of the $\phi_c$ voltage exceeds the level of voltage across capacitor 5 by 1 diode drop, for similarly recharging to capacitor 5 and supplying power to the inverter 23, as described for $\phi_a$. Similar comments apply for the recharging of capacitor 7 between times $t_3$ and $t_4$, where the negative going $\phi_a$ voltage has an amplitude greater than the level of voltage across capacitor 7 by at least 1 diode drop, during which time the negative recharge current for capacitor 7 attains a peak amplitude of 125 amperes. The operation of rectifier 1 for supplying power to a reactive load 23, 39, is very inefficient, in that the source utilization is poor, and, in addition, laboratory tests have shown that the waveforms of the polyphase input voltages are distorted during the times of recharging the capacitors 5 and 7. In addition, the capacitors 5 and 7 must be relatively large in size, in order to handle the power requirements of the load, including the power dissipated by the reactive load currents flowing through these capacitors during such operation, and any ripple currents passing therethrough. The capacitors 5 and 7 do provide a smoothing function, as to any ripple voltages that are present at the positive and negative output terminals 15 and 17, but in many applications such a smoothing function is not required in that polyphase rectifiers have an inherently low ripple content in their dc output voltages, typically 4.2% ripple in a three-wire polyphase system (no neutral), and 18.3% in a four-wire system (three voltage phases plus a neutral). It is known to include a resistor between the common connection of the capacitors 5 and 7, and the neutral or reference voltage terminal 19, to improve the operation of the rectifier 1 and utilization of the polyphase voltage source or utility line, but the improvement is only marginal. Alternatively filter choker can be added between the common point of the rectifiers and the filter capacitors to reduce the amplitude of the current spikes shown in FIG. 2, but chokers are large, expensive and inefficient.

Figure 3:
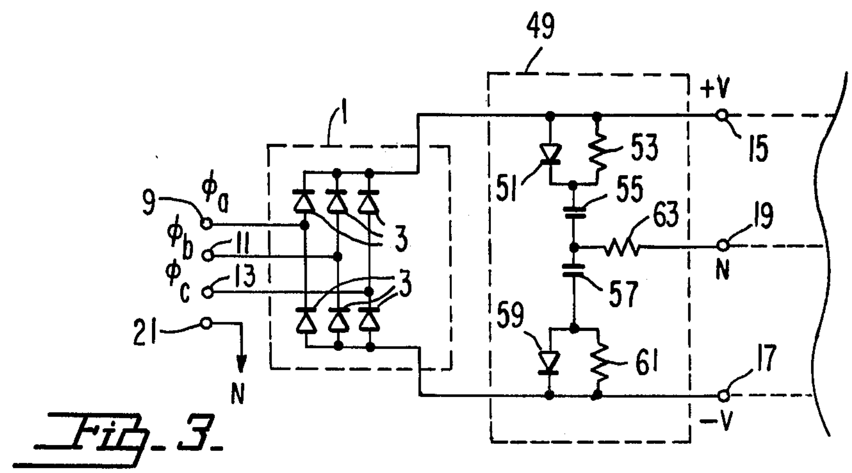
FIG. 3 shows a circuit schematic diagram of a first embodiment of the invention.

In FIG. 3, the rectifier 1 has been modified to include a first embodiment of the invention, the filter circuit 49 in place of the prior filter capacitors 5 and 7. As shown, the filter 49 includes a first or positive section that consists of a diode 51, a resistor 53, and a capacitor 55, and a substantially identical second or negative section consisting of a capacitor 57, a diode 59, and a resistor 61. The only difference between the first and second sections of the filter 49 is the polarization of the diode 51 relative to its respective output voltage terminal 15, compared to the opposite polarization of the diode 59 relative to its respective output voltage terminal 17. A relatively low value resistor 63 is included between the common connection of the capacitors 55 and 57 and a neutral reference terminal 19 to ensure that when a four-wire polyphase utility service is connected to the input terminals 9, 11, 13, and 21 of the rectifier 1, that the common connection between these capacitors 55, 57 is maintained at substantially zero volt. In operation of the filter 49, when power is initially applied to the rectifier 1, capacitor 55 rapidly charges to substantially +V volts via the low impedance charging current conduction path provided by diode 51, and capacitor 57 rapidly charges to having level thereacross of substantially −V volts via the low impedance current conduction path provided by diode 59 for negative charging current. In this example, it is assumed that the utility voltage or the polyphase input voltage is 60 Hz in frequency. Accordingly, the frequency of the ripple voltage appearing at the output terminals 15 and 17 has a frequency of about 360 Hz, thereby providing a period between successive peaks of the ripple voltage of about 2.66 milliseconds. The time constant for the combination of resistor 53 and capacitor 55, and the combination of resistor 61 and capacitor 57, is chosen to be large compared to the ripple, for example, greater than 10 milliseconds, in order to prevent the capacitors from substantially discharging. An additional feature provided by this long discharge time constant compared to the frequency of the ripple voltage, is that the capacitor 55 will charge to a voltage level thereacross substantially equal to the level of the positive output voltage +V volts, plus the peak amplitude of the ripple voltage at terminal 15. Similarly, capacitor 57 will charge to have a voltage level thereacross equal to −V volts, plus the peak amplitude of the ripple voltage appearing at output terminal 17. As a result, ripple current is blocked from flowing through the capacitors 55 and 57 by the level of voltage across these capacitors. Also, as shown in FIG. 6 for the $\phi_a$ voltage, better utilization of the utility or polyphase power source is obtained, in that the rectifier 1 supplies substantially all of the power requirements of the reactive load 23, 39, in this example (not shown in FIG. 3 for ease of illustration). Reactive currents from the load 23, 39 are conducted from terminal 15 to terminal 19 via the current conduction path provided by diode 51, capacitor 55, and resistor 63, and in the opposite direction by resistors 53 and 63, and capacitor 55. Reactive load currents are conducted from terminal 19 to terminal 17 via the current conduction path provided by diode 59, capacitor 57, and resistor 63, and in the opposite direction via the current conduction path provided by resistors 61 and 63, and capacitor 57. The capacitors 55 and 57 are not required to supply power to the load, permitting these capacitors to be substantially lower power and smaller than capacitors 5 and 7 of FIG. 1.

In FIG. 4, a second embodiment of the invention is shown for use in applications where a four-wire, three-phase utility service is not available, the only available three-phase utility power being a three-wire service. For purposes of illustration, a three-wire, three-phase utility service is shown as the wye-connected transformer 65 connected to operating voltage or power terminals 9, 11, and 13 of rectifier 1. As shown, a second reference terminal 67 has been added to the peak current eliminating filter 49, for connecting the common connection between the capacitors 55 and 57 directly to the common terminal of the reactive load 23, in this example (not shown for simplifying the illustration). The present inventor discovered that when filter 49 was so connected to a rectifier supplied power from a three-wire utility system, that it was difficult to maintain the voltage balance or the equality between the upper and lower sections of the filter 49, causing the voltage at the common connection between the capacitors 55 and 57 to vary from zero volts. In operating the filter 49, in the second embodiment of the invention, for use with a three-wire, three-phase utility source, as previously explained, the present inventor found it necessary to include a balancing network 69, as shown, to supply an error signal to the controller 41, for changing the operation of the inverter 23 in such manner to substantially maintain the common connection between the capacitors 55 and 57 at terminal 67 at zero volt, as will be described. The balancing network includes a pair of resistors 71 and 73 connected in series, and the series combination connected in parallel across the series combination of capacitors 55 and 57. The common connection between the resistors 71 and 73 is made at terminal 75. A linear amplifier 77, in this example a differential operational amplifier, has its inverting or negative terminal connected to the common connection between the capacitors 55 and 57, and its positive or non-inverting terminal connected to terminal 75 of the resistive divider 71, 73. The output of the amplifier 77 is connected to the controller 41 for providing an error signal indicative of the difference in voltage between terminals 75 and 67. When this voltage difference is zero volt, the system is balanced, but whenever there is a negative or positive difference in voltage between these terminals 67, 75, the error signal produced causes controller 41 to operate the inverter 23 to change the flow of current through the filter 49 for bringing the system back into balance. This is accomplished by changing the dc component in the output waveform from the inverter 23, to cause necessary changes in the magnitudes of the reactive load currents.

In FIG. 5, the level of voltage across capacitor 55 is shown by the dashed line 79, and the ripple voltage at output terminal 15 by waveform 81. Similarly, the level voltage across capacitor 56 is shown by the dashed or broken line 83, and the ripple voltage at terminal 17 is shown by waveform 85. As previously explained, the dc level of voltage across capacitor 55 is at least equal to the peak amplitude of ripple voltage 81 plus the level of dc voltage at terminal 15. Similarly, as previously discussed, the level of dc voltage across capacitor 57 is at least equal to the level of dc voltage at terminal 17 plus the peak amplitude of the ripple voltage 85. Note that in FIG. 5 the vertical or y-axis is shown in terms of the percent of the peak ac voltage of the polyphase input voltages.

In FIG. 6, the current supplied by $\phi_a$ of the polyphase line voltage to the motor is shown for one cycle of the sinewave of this phase, in the circuits of FIGS. 3 and 4. The waveform 87 represents the current delivered to the motor 39. The ripple current is shown by waveform 89 for the positive half cycle, and 89' for the negative half cycle. Note that in contrast to the current waveforms described in FIG. 2, for the prior art filter system, the present filter 49 of either the first or second embodiments of the invention, permits the power available from the utility company to be drawn over a substantial portion of the period or positive and negative half cycles of the three-phase voltages. Accordingly, the utility power is better utilized. In addition, the capacitors 55 and 57 of filter 49 provide high frequency filtering of the positive and negative voltages at terminals 15 and 17, respectively.

What is claimed is:

1. In a system including at least a three-phase polyphase rectifier having a first terminal for providing a positive dc output voltage, a second terminal for providing a negative dc output voltage, and a third terminal for providing a point of reference potential for said positive and negative dc voltages, and a reactive load having a pair of operating voltage terminals connected to said first and second terminals, respectively, and a common terminal connected to said third terminal, said reactive load producing reactive currents that must be permitted to flow bidirectionally between said rectifier and said load, a filter circuit comprising:

first and second capacitors each having one end connected to said third terminal;

current conductive means connected in series with said first and second capacitors between said first and second terminals, for initially providing rapid charging of said first and second capacitors to have a level of voltage thereacross at least equal to the level of said positive and negative dc voltages, plus the peak voltage of any ripple voltages imposed thereupon, respectively, and thereafter substantially preventing discharge of said first and second capacitors into said reactive load, concurrent with permitting reactive load currents to flow between said first and third terminals and through said first capacitor, and between said second and third terminals and through said second capacitor, thereby ensuring that said rectifier provides substantially all of the current requirements of said reactive load exclusive of said filter.

2. The filter circuit of claim 1, wherein said current conductive means includes:

first unidirectional current means connected between said first terminal and the other end of said first capacitor, polarized for passing current only from said first terminal to said first capacitor;

first resistive means connected between said first terminal and the other end of said first capacitor, whereby said first unidirectional current means provides a low-impedance current path for both initially charging said first capacitor to have a level of voltage thereacross approaching the level of said positive dc voltage, and for passing reactive load current to said first capacitor, said first resistive means providing a relatively high-impedance current path for substantially preventing the discharge of said first capacitor, for maintaining the level of voltage thereacross at about that of said positive dc voltage, while providing a current path for reactive load current to flow from said first capacitor to said first terminal;

second undirectional current means connected between said second terminal and the other end of said second capacitor, polarized for passing current only from said second capacitor to said second terminal; and second resistive means connected between said second terminal and the other end of said second capacitor, whereby said second unidirectional current means provides a low-impedance current path for initially charging said second capacitor to have a level of voltage thereacross approaching the level of said negative dc voltage, and for passing reactive load current from said second capacitor to said second terminal, and said second resistive means providing a relatively high impedance current path for substantially preventing the discharge of said second capacitor for maintaining the level of voltage thereacross at about that of said negative dc voltage, while providing a current path for reactive load current to flow from said second terminal to said second capacitor.

3. The filter circuit of claim 2, further including the combination of said first capacitor and first resistance means, and the combination of said second capacitor and second resistance means, each having a time constant about four times the period between successive peaks of ripple voltages appearing at said first and second terminals, respectively, for substantially blocking the flow of ripple current in said first and second capacitors, while permitting these capacitors to both act as high-pass filters and provide cyclic reactive energy exchange with said reactive load.

4. The filter circuit of claims 2 or 3, wherein said first and second unidirectional current means each consist of a diode.

5. The filter circuit of claims 2 or 3, wherein said first and second resistive means each consist of a resistor.

6. The filter circuit of claims 1, or 2, or 3, further including a relatively low value resistor connected between the common connection of said first and second capacitors and said third terminal, said resistor ensuring that the voltage between said third terminal and the common connection between said first and second capacitors is substantially zero volt, whenever a neutral line, from a four-wire ac voltage service supplying power to said polyphase rectifier, is connected to said third terminal.

7. The filter circuit of claims 1, or 2, or 3, further including said reactive load consisting of inverter means connected between said first and second terminals, and having a common terminal connected to said third terminal, and a plurality of polyphase voltage output terminals, individually connected to the winding of a polyphase ac motor, said inverter means including controller means that is programmed for controlling the operation of said inverter means for operating said ac motor; and means responsive to the voltage across said first and second capacitors, for providing a control signal to said controller means for adjusting the operation of said inverter means to equate the level of voltage across said first and second capacitors, thereby ensuring that the voltage at said third terminal is substantially zero volt relative to said positive and negative dc voltages, whenever said rectifier is supplied power from a three-wire ac service.

8. A polyphase rectifier for receiving at least three-phase polyphase input voltages for rectification into a positive voltage at a first terminal, and a negative voltage at a second terminal, wherein it is known to include a pair of filter and smoothing capacitors connected in series between said first and second terminals, the common connection between said pair of capacitors being connected to a neutral terminal for connection to a point of reference potential, wherein typically said capacitors supply power during a substantial portion of the cycle for each input voltage waveform, to a reactive load connected between said first and second terminals, said reactive load also having a common connection to said third terminal, said pair of capacitors being recharged during a relatively short portion of alternate half-cycles, respectively, of and about the peak amplitudes of the phase-to-phase voltages of said polyphase input voltages, causing substantially large current flow from the source of said polyphase input voltages to said rectifier, and from said rectifier to said load, at such times of recharging said capacitors, it being desired to substantially reduce the peak current demands upon said rectifier and source of said polyphase voltage, wherein the improvement in filtering comprises:

first means connected between said first terminal and one of said pair of capacitors, for providing a relatively low-impedance current path for reactive currents to flow from said first terminal into said one capacitor, and a relatively high-impedance current path for reactive current flow in the opposite direction, the time constant for the high-impedance current path and said one capacitor being made about four times greater than the period between successive peaks of a ripple voltage appearing at said first terminal; and second means connected between said second terminal and the other of said pair of capacitors, for providing a relatively low-impedance current path for reactive currents to flow from said other capacitor into said second terminal, and a relatively high-impedance current path for reactive current flow in the opposite direction, the time constant for the high-impedance current path and said other capacitor being made about four times greater than the period between successive peaks of a ripple voltage appearing at said second terminal;

said first and second means further serving to both substantially eliminate the requirement that said capacitors supply non-reactive current to said load, and to block the flow of ripple current from said first and second terminals to said pair of capacitors, respectively, by permitting said capacitors to charge to a level where the voltage thereacross is greater than the peak voltage and dc level of said ripple voltages, allowing a significant reduction in the size of said capacitors and substantially reducing the magnitude of the peak current requirements upon said rectifier, thereby permitting the application of a relatively lower power rectifier, better utilization of the source of polyphase input voltages, and the use of said pair of capacitors each as high frequency filter capacitors.

9. The polyphase rectifier of claim 8, wherein said first means includes:

unidirectional current means connected between said first terminal and said one capacitor, polarized for passing current from said first terminal to said one capacitor, for providing said relatively low-impedance current path therebetween; and resistive means connected between said first terminal and said one capacitor for providing said relatively high-impedance current path therebetween.

10. The polyphase rectifier of claim 8, wherein said second means includes:

unidirectional current means connected between said second terminal and said other capacitor, polarized for passing current from said other capacitor to said second terminal, for providing said relatively low-impedance current path therebetween; and resistive means connected between said second terminal and said other capacitor, for providing said relatively high-impedance current path therebetween.

11. The polyphase rectifier of claim 9 or 10, wherein said unidirectional current means includes a diode.

12. In at least a three-phase polyphase rectifier system having a first terminal for providing a positive polarity dc voltage to a reactive load, a second terminal for providing a negative polarity dc voltage to said load, and a third terminal for providing a point of reference potential for said positive and negative dc voltages, and for connection to a common terminal of said load, a first filter capacitor being coupled between said first and third terminals, and a second filter capacitor being coupled between said second and third terminals, and a second filter capacitor being coupled between said second and third terminals, a method of filtering for substantially eliminating the relatively high peak magnitude short duration current demands upon said rectifier for recharging said first and second capacitors during alternate half-cycles, respectively, of the output voltages of the polyphase voltage source supplying power to said rectifier, said first and second capacitors discharging into a reactive load at times that the level of voltage thereacross is greater than the level of voltage at said first and second terminals, respectively, comprising the steps of:

initially rapidly charging said first and second capacitors to the maximum level and polarity of voltage available at said first and second terminals, respectively, and substantially preventing the discharging of said first and second capacitors into said load, concurrent with permitting any reactive load currents to flow bidirectionally between each one of said first and second capacitors and said reactive load, respectively.

13. The method of claim 12, further including the step of concurrently making the time constant for the charging of said first and second capacitors relatively low, and the time constant for discharging of said first and second capacitors relatively high, thereby permitting said first and second capacitors to charge to a level where the voltage thereacross is greater than the peak value plus dc level of ripple voltages at said first and second terminals, respectively, substantially preventing the flow of ripple current through said first and second capacitors.

14. In a polyphase rectifier system for receiving at least three-phase polyphase input voltages for rectification into a positive voltage at a first terminal, and a negative voltage at a second terminal, each with reference to a point of reference potential at a third terminal, a first filter capacitor being typically connected between said first and third terminals, a second filter capacitor being typically connected between said second and third terminals, and a reactive load being connected between said first and second terminals, said reactive load having a common connection to said third terminal, a method of filtering substantially reducing the peak magnitude of current demanded from said rectifier over a relatively short period of time about the peak amplitudes of the voltages of said polyphase input voltage, increasing the period of time over each cycle of the voltage phases of said polyphase input voltages that said rectifier delivers the reduced peak magnitude of current to said load, and substantially blocking the flow of ripple current in said first and second capacitors, thereby improving the utilization of the source of said polyphase input voltages, reducing conducted noise, and reducing the power requirements of both said rectifier and said first and second capacitors, said method comprising the steps of:

providing a relatively low-impedance unidirectional current path for the flow of reactive load current and initial charging current from said first terminal to said first capacitor, for permitting said capacitor to charge to a level of voltage greater than the peak positive plus dc level of ripple voltage at said first terminal;

providing a relatively high-impedance current path for the flow of reactive current and discharge current from said first capacitor to said first terminal;

providing a relatively low-impedance unidirectional current path for the flow of reactive load current and initial charging current from said second capacitor to said second terminal; and providing a relatively high-impedance current path for the flow of reactive current and discharge current from said second terminal to said second capacitor.

15. In a system including at least a three-phase polyphase rectifier having a first terminal for providing a dc output voltage, and a second terminal for providing a point of reference potential for said dc voltage, and a reactive load having a pair of operating voltage terminals connected to said first and second terminals, respectively, said reactive load producing reactive currents that must be permitted to flow bidirectionally between said rectifier and said load, a filter circuit comprising:

a capacitor having one end connected to said second terminal;

current conductive means connected in series with said capacitor between said first and second terminals, for initially providing rapid charging of said capacitor to have a level of voltage thereacross at least equal to the level of said dc voltage, plus the peak voltage of any ripple voltages imposed thereupon, respectively, and thereafter substantially preventing discharge of said capacitor into said reactive load, concurrent with permitting reactive load currents to flow between said first and second terminals, thereby ensuring that said rectifier provides substantially all of the current requirements of said reactive load exclusive of said filter.

16. The filter circuit of claim 15, wherein said current conductive means includes:

unidirectional current means connected between said first terminal and the other end of said capacitor; and resistive means connected between said first terminal and the other end of said capacitor, whereby said first unidirectional current means provides a low-impedance current path for both initially charging said capacitor to have a level of voltage thereacross approaching the level of said dc voltage, and for passing reactive load current to said capacitor, said resistive means providing a relatively high-impedance current path for substantially preventing the discharge of said capacitor, for maintaining the level of voltage thereacross at about that of said dc voltage, while providing a current path for reactive load current to flow from said capacitor to said first terminal.

17. The filter circuit of claim 16, further including the combination of said capacitor and resistive means, having a time constant about four times the period between successive peaks of ripple voltages appearing at said first terminal, for substantially blocking the flow of ripple current in said capacitor, while permitting said capacitor to both act as high-pass filter and provide cyclic reactive energy exchange with said reactive load.

18. The filter circuit of claims 16 or 17, wherein said unidirectional current means consists of a diode.

19. The filter circuit of claims 16 or 17 wherein said resistive means consists of a resistor.

20. In at least a three-phase polyphase rectifier system having a first terminal for providing a dc output voltage to a reactive load, and a second terminal for providing a point of reference potential for dc voltage, and for connection to a common terminal of said load, and a filter capacitor coupled between said first and second terminals, a method of filtering for substantially eliminating the relatively high peak magnitude short duration current demands upon said rectifier for recharging said capacitor during alternate half-cycles of the output voltages of the polyphase voltage source supplying power to said rectifier, said capacitor discharging into said reactive load at times that the level of voltage thereacross is greater than the level of voltage at said first and second terminals, respectively, comprising the steps of:

initially rapidly charging said capacitor to the maximum level and polarity of voltage available between said first and second terminals; and substantially preventing the discharging of said capacitor into said load, concurrent with permitting any reactive load currents to flow bidirectionally between said capacitor and said reactive load.

21. The method of claim 20 further including the step of concurrently making the time constant for the charging of said capacitor relatively low and the time constant for discharging said capacitor relatively high, thereby permitting said capacitor to charge to a level where the voltage thereacross is greater than the peak value plus the dc level of ripple voltages at said first and second terminals, respectively, substantially preventing the flow of ripple current through said capacitor.

22. In a polyphase rectifier system for receiving at least three-phase polyphase input voltages for rectification into a dc voltage at a first terminal, with reference to a point of reference potential at a second terminal, a filter capacitor being typically connected between said first and second terminals, and a reactive load being connected between said first and second terminals, a method of filtering substantially reducing the peak magnitude of current demanded from said rectifier over a relatively short period of time about the peak amplitudes of the voltages of said polyphase input voltage, increasing the period of time over each cycle of the voltage phases of said polyphase input voltages that said rectifier delivers the reduced peak magnitude of current to said load, and substantially blocking the flow of ripple current in said capacitor, thereby improving the utilization of the source of said polyphase input voltages, reducing conducted noise, and reducing the power requirements of both said rectifier and said capacitor, said method comprising the steps of:

providing a relatively low-impedance unidirectional current path for the flow of reactive load current and initial charging current from said first terminal to said capacitor, for permitting said capacitor to charge to a level of voltage greater than the peak positive plus dc level of ripple voltage at said first terminal; and providing a relatively high-impedance current path for the flow of reactive current from said capacitor to said first terminal.

* * * * *